United States Patent
Weber et al.

(10) Patent No.: US 7,636,889 B2
(45) Date of Patent: Dec. 22, 2009

(54) CONTROLLING BEHAVIOR OF ELEMENTS IN A DISPLAY ENVIRONMENT

(75) Inventors: Ralf Weber, Santa Clara, CA (US); Thomas Matthieu Alsina, Paris (FR)

(73) Assignee: Apple Inc., Cupertino, CA (US)

(*) Notice: Subject to any disclaimer, the term of this patent is extended or adjusted under 35 U.S.C. 154(b) by 127 days.

(21) Appl. No.: 11/327,184

(22) Filed: Jan. 6, 2006

(65) Prior Publication Data
US 2007/0162853 A1 Jul. 12, 2007

(51) Int. Cl.
G06F 3/00 (2006.01)

(52) U.S. Cl. ............... 715/723; 715/202; 715/716; 715/719; 715/724; 715/725; 715/726; 715/731; 715/810; 715/825; 715/844; 345/672; 345/681; 345/682; 345/684; 345/687

(58) Field of Classification Search ........... 715/825, 715/202, 716, 719, 723–726, 731, 810, 844; 345/672, 681, 682, 684, 687
See application file for complete search history.

(56) References Cited

U.S. PATENT DOCUMENTS

| | | | |
|---|---|---|---|
| 5,642,430 A * | 6/1997 | Greer et al. | 382/100 |
| 5,675,752 A | 10/1997 | Scott et al. | |
| 5,729,673 A * | 3/1998 | Cooper et al. | 345/427 |
| 5,914,717 A | 6/1999 | Kleewein et al. | |
| 6,246,402 B1 | 6/2001 | Setogawa et al. | |
| 6,310,625 B1 * | 10/2001 | Yoshio et al. | 345/473 |
| 6,433,797 B1 | 8/2002 | Zellweger | |
| 6,717,591 B1 * | 4/2004 | Fiveash et al. | 715/732 |
| 7,073,127 B2 | 7/2006 | Zhao et al. | |
| 7,222,300 B2 | 5/2007 | Toyama et al. | |
| 7,359,617 B2 | 4/2008 | Ma | |
| 7,383,508 B2 | 6/2008 | Toyama et al. | |
| 7,432,940 B2 | 10/2008 | Brook et al. | |
| 2003/0016239 A1 | 1/2003 | Christopher | |
| 2003/0151621 A1 | 8/2003 | McEvilly et al. | |
| 2003/0234805 A1 | 12/2003 | Toyama et al. | |
| 2004/0001079 A1 | 1/2004 | Zhao et al. | |
| 2004/0046801 A1 | 3/2004 | Lin et al. | |
| 2004/0131336 A1 | 7/2004 | Matsuno et al. | |
| 2005/0010599 A1 * | 1/2005 | Kake et al. | 707/104.1 |
| 2005/0138569 A1 * | 6/2005 | Baxter et al. | 715/788 |
| 2005/0154679 A1 | 7/2005 | Bielak | |
| 2005/0207442 A1 | 9/2005 | Zoest et al. | |
| 2005/0210410 A1 * | 9/2005 | Ohwa et al. | 715/821 |
| 2005/0251754 A1 | 11/2005 | Padgett et al. | |

(Continued)

FOREIGN PATENT DOCUMENTS

WO WO 2005050652 A1 6/2005

*Primary Examiner*—Kieu Vu
*Assistant Examiner*—Patrick F Riegler
(74) *Attorney, Agent, or Firm*—Fish & Richardson P.C.

(57) ABSTRACT

In one implementation, a computer program product, encoded on a computer-readable medium, is provided. The computer program product is operable to cause a data processing apparatus to perform operations including generating a menu screen template, the menu screen template including one or more menu elements. The computer program product also causes a data processing apparatus to perform operations including incorporating user selected media content in the menu screen template and calculating a motion path associated with one or more menu elements, the calculated motion path being automatically adjusted according to parameters of the selected media content.

18 Claims, 13 Drawing Sheets

U.S. PATENT DOCUMENTS

| | | |
|---|---|---|
| 2005/0278634 A1* | 12/2005 | Chen et al. .................. 715/723 |
| 2005/0289466 A1* | 12/2005 | Chen .......................... 715/731 |
| 2006/0001835 A1 | 1/2006 | Johnson |
| 2006/0048056 A1* | 3/2006 | Huang ........................ 715/719 |
| 2006/0055700 A1* | 3/2006 | Niles et al. ................. 345/473 |
| 2006/0129909 A1 | 6/2006 | Butt et al. |
| 2006/0184890 A1 | 8/2006 | Altenhofen |
| 2006/0282794 A1 | 12/2006 | Chen et al. |
| 2007/0038938 A1 | 2/2007 | Canora et al. |
| 2007/0162855 A1 | 7/2007 | Hawk et al. |
| 2007/0162857 A1 | 7/2007 | Weber et al. |
| 2009/0031254 A1 | 1/2009 | Herpel et al. |

* cited by examiner

CONTROLLING BEHAVIOR OF ELEMENTS IN A DISPLAY ENVIRONMENT

CROSS-REFERENCE TO RELATED APPLICATIONS

This application is related to U.S. application Ser. No. 10/337,924 filed on Jan. 6, 2003, and Ser. No. 10/742,957 filed on Dec. 22, 2003, which are hereby incorporated by reference in their entirety.

BACKGROUND

The present disclosure relates to multimedia applications.

The proliferation of various forms of digital media (e.g., still images, audio, video, etc.) has created a continuing need for improved multimedia authoring tools. Consumers typically use media authoring tools to compose, edit, and arrange digital media (e.g., video and audio content, still images, slideshows, etc.) as part of a media project. Consumers render the finished media project into a file, which can be burned onto a Digital Versatile Disc ("DVD") or other media, which can be played on a variety of devices.

Conventional multimedia authoring tools allow a user to generate professional quality media projects. In addition to providing content, the authoring tools typically enable users to create menu and submenu screens for enabling viewers to navigate content stored on the DVD using, for example, a television remote control or a mouse. For example, a typical DVD includes a hierarchy of menus allowing the viewer to select a movie to play or to access other features or content on the DVD, such as a chapter index for jumping to a particular chapter in the movie.

SUMMARY

In general, in one aspect, a computer program product, encoded on a computer-readable medium, is provided. The computer program product is operable to cause a data processing apparatus to perform operations including generating a menu screen template, the menu screen template including one or more menu elements. The computer program product also causes a data processing apparatus to perform operations including incorporating user selected media content in the menu screen template and calculating a motion path associated with one or more menu elements, the calculated motion path being automatically adjusted according to parameters of the selected media content.

Implementations can include one or more of the following features. The computer program product can further include generating a menu screen including rendering the menu elements according to the calculated motion path. Generating a menu screen template can further include receiving a user input selecting a theme for the menu screen template. Calculating a motion path can further include receiving a base first motion path and adjusting the base motion path according to one or more input parameters associated with the selected media content. Adjusting the base motion path can further include adjusting a speed of the motion path, generating a single motion path for a plurality of menu elements, and adjusting a motion path to a menu screen duration.

In general, in one aspect, a computer program product, encoded on a computer-readable medium, is provided. The computer program product is operable to cause a data processing apparatus to perform operations including generating a user interface for generating a menu screen including one or more adjusted motion paths. The user interface includes one or more content menus for selecting content for incorporation in a menu screen and a menu screen window for providing a menu screen template having one or more motion paths, wherein the menu screen window is configured to receive user selected media content for incorporation in the menu screen template. The computer program product also calculates a motion path associated with one or more menu elements, the calculate motion path being automatically adjusted according to parameters of the selected media content.

Implementations can include one or more of the following features. The user interface can further include a theme selection menu, where selection of a theme provides one or more menu screen templates including a plurality of menu elements. Each menu screen template can include a theme definition that includes one or more animated menu elements defined by one or more motion paths. The menu elements can include drop zones configured to receive user selected media content.

In general, in another aspect, a computer-implemented method is provided. The method includes generating a menu screen template, the menu screen template including one or more menu elements. The method also includes incorporating user selected media content in the menu screen template. Additionally, the method further includes calculating a motion path associated with one or more menu elements, the calculated motion path being automatically adjusted according to parameters of the selected media content.

The disclosed implementations provide several advantages over conventional media authoring tools. Specifically, animated menu screens for a media project are disclosed that include elements, which behave according to a particular defined motion path. The elements can be animated individually and as part of a group of elements. The animated menu screens provide a professional look and feel to a media project while minimizing user input. The motion path defining the animation of one or more elements in a menu screen can be automatically adjusted according to parameters of the particular user content included in the menu screen. The motion path for an element can be adjusted to modify the acceleration of the element as well to match the duration of a menu screen loop. The motion path of an element can vary depending on the menu period such as an introduction period, a main menu period, and an outro period. Multiple elements can be grouped together to behave according to a single motion path.

Additionally, using motion paths to animate menu elements reduces a need to use other structures such as movie files with pre-rendered animations. As a result, motion path animation can be faster and more fluid. Because animations are not included in a movie file, the animation can be independent of movie frame rate. Also, the amount of storages space necessary for the animations can be reduced. Furthermore, menu loop behavior is improved including the ability to exactly loop elements without discontinuity at looping point regardless of the actual menu duration.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
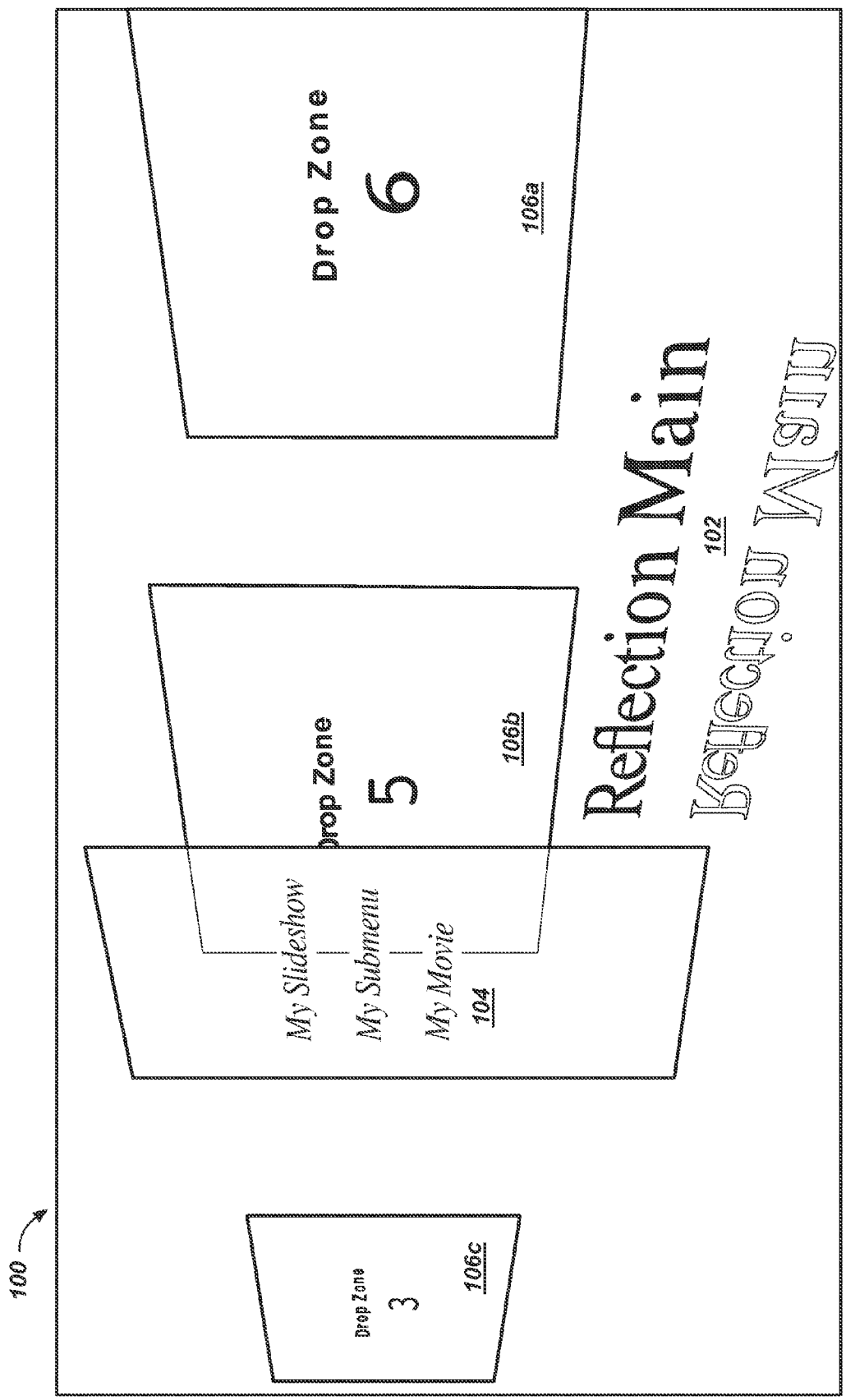
FIG. 1 shows a screenshot of a menu screen.

A media project including a number menu screens can be created using a menu generator. The menu screens allow a user to navigate media content linked to elements of the menu screen (e.g., the menus of a DVD). The menu screens can also include a number of static and animated elements. The animated elements can follow a defined motion path governing the behavior of the animated elements. The motion path of elements can be adjusted according to media content included in the menu screens. FIG. 1 shows a menu screen 100 of a media project, for example, the main menu screen of a DVD menu. The menu screen 100 includes a number of elements including a title 102, a selection menu 104, and drop zones 106a, 106b, and 106c. The menu screen 100 can include a number of elements which are animated according to a defined motion path, for example, the drop zones 106 can translate or rotate, the selection menu 104 can translate into position, or other elements such as the title 102 can vary in transparency during the presentation of menu screen 100.

Each menu screen can be based on a template associated with a particular theme. A theme template includes a number of menu screen elements having one or more properties. In some implementations, the menu screen elements and their associated properties are defined by a theme definition. Theme properties can include, for example, a shape, depth, transparency, and position of a menu screen element. Element properties can also change as a function of time. For example, elements can change with time in position, color, transparency, or other properties. The theme definition can define a location for menu screen content, buttons, background graphics, animation, text regions, drop zones and other theme properties. Menu elements can be organized in a hierarchal structure in which an individual element can be part of a group of higher level elements.

Drop zones (e.g., drop zones 106a, 106b, and 106c) are regions defined by the theme definition and positioned within the menu screen environment (i.e., the displayable area of menu screen 100). Drop zone properties can include position, size, orientation, transparency, and depth. Drop zones can also include animation behavior, which changes over time such as rotational and translational movement. Drop zones can be configured to contain media content. For example, a user can drop an image or a film clip in a drop zone.

The theme definition can also include one or more patch files. In one implementation, a patch file is provided for each element defined by the theme definition. The patch file can be used to render the element, for example using a rendering component. For example, a patch file can include data describing the information and functions for rendering the element associated with the patch file. In one implementation, the rendering component, after determining functions required by the element from the received patch file, can call one or more plug-in programs to perform the specified function. The rendering component can use the patch files and plug-ins to render the completed menu screens.

Theme definitions, including drop zones and patch files, are discussed in U.S. patent application Ser. No. 10/337,924 filed on Jan. 6, 2003, and Ser. No. 10/742,957 filed on Dec. 22, 2003, the entirety of which are hereby incorporated by reference. Generation of menu screens using user selected themes and media content, is described in U.S. patent application Ser. No. 11/327,280, entitled "Automated Multimedia Authoring," filed on Jan. 6, 2006.

In the example implementation shown in FIG. 1, the drop zones 106a, 106b, and 106c can change position, following a predefined motion path, while the menu screen 100 is presented. Particular motion paths can be defined for individual elements, groups of elements, a subgroup of a group of elements, or any other combination of elements in a particular theme. For example, an individual element can have a motion path animation that is in addition to the motion path defined for a group of elements including that individual element. The motion path can be adjusted from the motion path defined by the theme definition according to the user selected media content. For example, menu duration can be adjusted to correspond with a duration of a movie clip selected to occupy a menu screen drop zone. The calculation of the motion path of an element is discussed in greater detail below with respect to FIG. 6.

Other menu screen elements, such as a selection menu 104, including one or more menu buttons, provide for user interaction and navigation of content found in the media project. Other elements provide for the look and feel of the menu screen such as the formatting of the title for the media project as well as background color, graphics, and other menu screen properties. A user can customize menu screen elements. For example, the user can specify the title 102 for the media project as well as customize selection menu 104 and add drop zone content.

Figure 2:
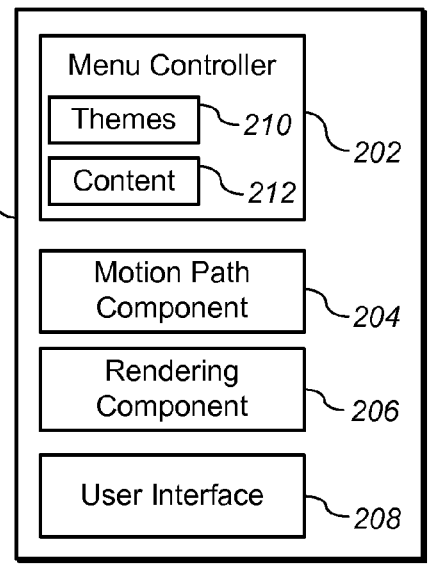
FIG. 2 shows a block diagram of a menu generator including a motion path component.

FIG. 2 shows a block diagram of a menu generator 200. The menu generator 200 includes a menu controller 202, a motion path component 204, a rendering component 206, and a user interface 208.

The menu controller 202 provides for the creation and editing of menu screens generated using the menu generator 200. The menu controller 202 can include themes 210. The themes 210 provide definitions for menu screen templates. The theme definition for the menu screen defines the elements within the menu screen according to the theme 210, including menu buttons, drop zones, titles, and background. Additionally, the theme definition can define a base motion path for any animated elements in the menu screen. The motion path defines how one or more properties of an element changes as a function of time. The motion path can be applied to a single element, a group of elements (e.g., a group of drop zones having the same motion path), or a combination of both (e.g., a motion path for a particular element in addition to the group motion path).

The menu controller 202 can also include media content 212. Media content 212 includes user selected media content for a particular media project. The user can select media content to be accessed using the menu screens as well as media content to populate the menu screens. For example, the particular audio, video, and image content selected for the menu screen (e.g., a movie clip for a particular drop zone in the menu screen).

The motion path component 204 calculates the actual motion path for the elements of the menu screen according to input parameters provided by the menu controller 202. The input parameters are discussed in more detail below and can include element properties, such as the base motion path including position, direction, speed, rotation, color, and transparency. In addition, the input parameters can include data regarding the user content placed in the menu screen, for example, the duration of movie clips placed in a drop zone or the duration of audio selected for the menu screen. The motion path component 204 can use the input parameters provided by the menu controller 202 to calculate an adjustment to the base motion path to provide an actual motion path for the elements at any given point in time. The motion path component 204 can provide output parameters to the rendering component 206.

The rendering component 206 renders the graphics of the menu screen according to the motion path calculations from the motion path component 204, for example, providing input signals to a display device presenting the menu screen. For example, the rendering component 206 renders the animation of an element in the menu screen according to the output parameters according to the actual motion path, including changes in position, color, or transparency of the element with time.

Figure 3:
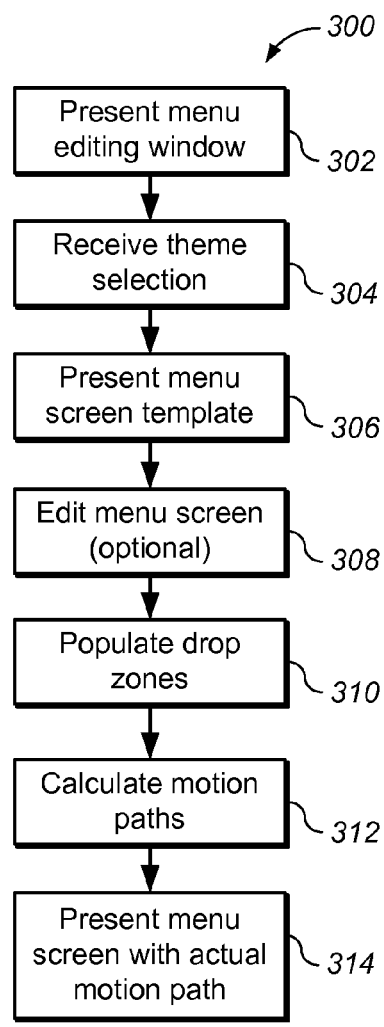
FIG. 3 shows a process for creating a menu screen including motion path elements.

FIG. 3 shows a process 300 for menu generation including motion path elements. The menu generation process 300 generates menu screens for a media project. The steps of process 300 do not have to occur in any specific order, and at least some steps can occur in parallel in a multithreading or multiprocessing environment.

The process 300 begins by presenting a menu editing window to a user (step 302). The menu editing window provides a user interface for customizing menu screen content. The menu generator receives a user selected theme for the menu screen (step 304). The user can select a theme from a menu in the menu editing window. The selected theme provides menus screen templates for the menu screens of a generated media project.

Once the user selects a particular theme, one or more menu screen templates corresponding to the selected theme are presented to the user (step 306). The presented menu screen templates can include elements having base motion paths, for example, a set of empty rotating drop zones, animated buttons, or other animated menu screen elements. The user can edit the text of each menu screen template to customize the menu screens to the user's media project (step 308). For example, the user can edit the title of the project displayed in the menu screen. Additionally, the user can edit the menu buttons presented by the menu screen in order to tailor the buttons to the user's project (e.g., button text identifying specific user content accessible through the button). Alternatively, the menu generator can automatically edit the text of the menu screen template according to media content previously identified by the user; thus user interaction in editing the templates can be an optional feature.

The user can also populate drop zones provided by the menu screen templates (step 310). The user can populate the drop zones, for example, by dragging and dropping media content from a menu in a menu editing window to a target drop zone. The populated content can include images, movie frames, movie clips and other media content. Alternatively, the drop zones can be automatically populated by the menu generator (e.g., menu generator 200) extracting media content based on user selected content for the media project.

Once the content has been defined for the menu screen, the menu generator can use information from the selected theme definition as well as from the selected media content in order to define the actual motion path of elements in the menu screen (step 312). The menu screen showing the actual motion path of the elements can be presented to the user (step 314).

Figure 4:
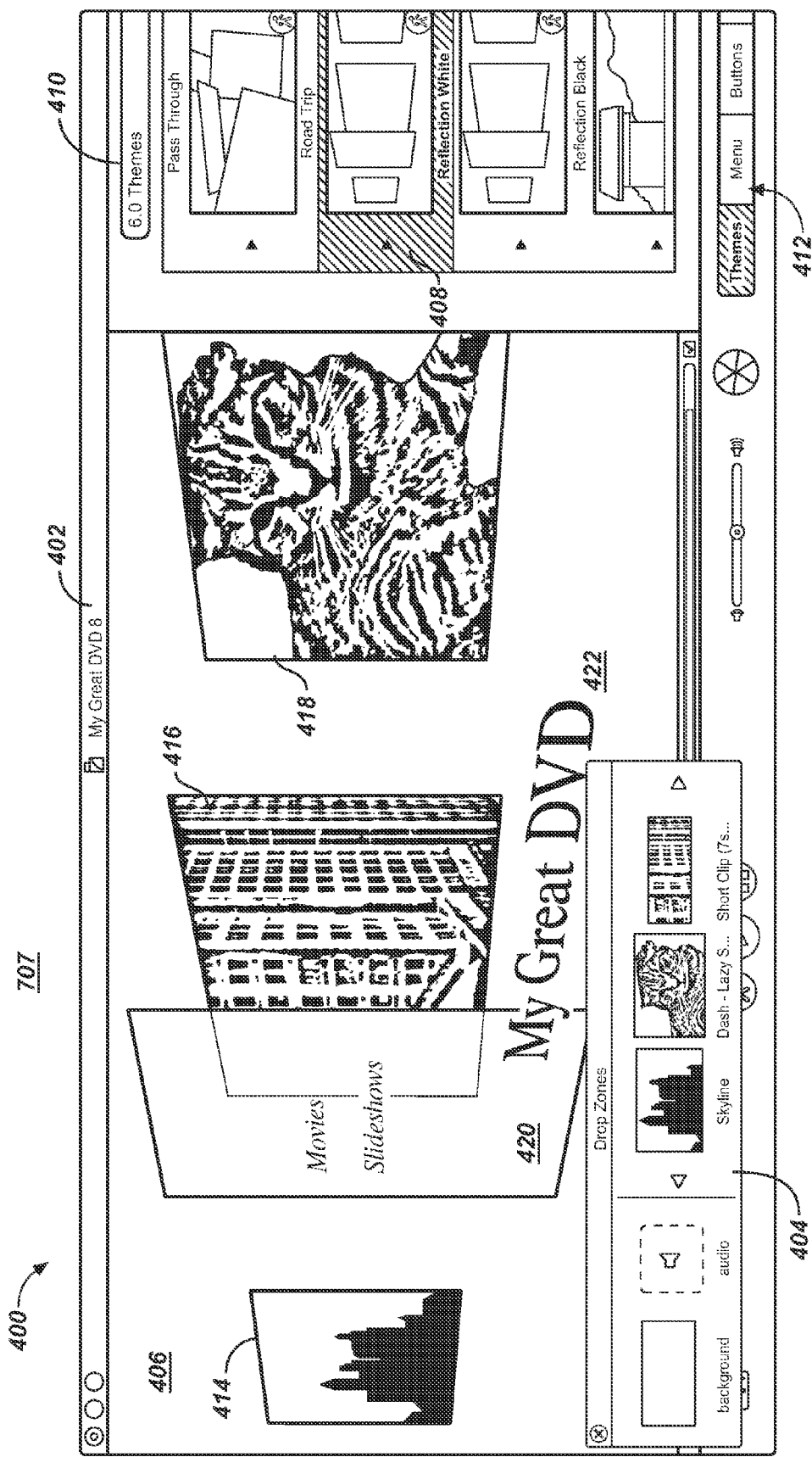
FIG. 4 shows a screenshot of a menu editor including a drop zone editor.

FIG. 4 shows a screenshot 400 of a menu editing window 402. The menu editing window 402 includes a drop zone editor 404, menu screen 406, content menu 408, and content selector buttons 412.

The drop zone editor 404 can be used to view and customize drop zone media content. The drop zone editor 404 can be a toolbar positionable at any place on a user display including any position on the menu editing window 402. In one implementation, the drop zone editor 404 is a partially transparent overlay region. The contents of the drop zone editor 404 are discussed in greater detail below with respect to FIG. 5. The menu screen 406 shows an example menu screen, including a number of drop zones 414, 416, and 418. The drop zones are shown populated with user content. The menu screen also includes a menu 420 and a title 422. In a finished media project, such as a DVD, the user can select media content stored on the DVD using the menu 420. The menu screen 406 is defined according to a user-selected theme and includes drop zones 414, 416, and 418, which are animated to follow a particular predefined motion path.

In some implementations, the theme can be selected using the content menu 408. The content menu 408 currently displays a list of themes that can be selected by the user. Different theme lists can be presented based on a selected theme list from a theme drop down menu 410. Other content can be displayed in the content menu 408 by selecting the appropriate content selector button 412. As shown in FIG. 4, the themes button of the content selector buttons 412 is selected. Other buttons can be selected to provide other content for selection and incorporation into the menu screen 406.

Figure 5:
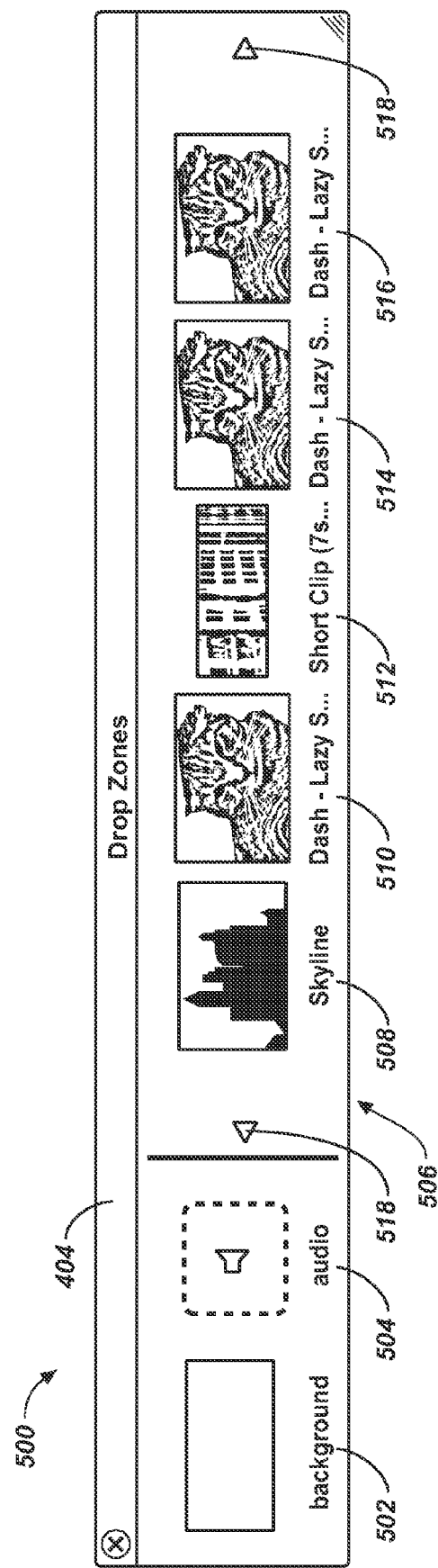
FIG. 5 shows an enlarged view of the drop zone editor of FIG. 4.

FIG. 5 shows a screenshot 500 of the drop zone editor 404. The drop zone editor 404 can include menu items for adjusting other properties of the menu screen 406. For example, menu background 502 allows the user to adjust the background color, image, movie, or other background element of the menu screen 406. Menu audio 504 allows the user to select audio to play while the menu screen 406 is presented.

The drop zone editor 404 also includes a drop zone menu 506. The drop zone menu 506 includes references to each drop zone in the menu screen 406. In FIG. 5, five drop zones 508, 510, 512, 514, and 516 are shown in drop zone menu 506. The user can drag media content such as images or movie clips, from content menu 408 to one of the drop zones in the drop zone menu 506. Positioning media content in the drop zone menu 506 can result in the same content appearing in the corresponding drop zone shown in the menu screen 406. Similarly, in one implementation, if the user drags media content directly to a drop zone in the menu screen 406, the corresponding drop zone in the drop zone menu 506 is filled with the media content.

The drop zone menu 506 can also be used to navigate between the drop zones. For example, navigation arrows 518 can be used to cycle through additional drop zones that are not shown (i.e., drop zones in addition to the five drop zones shown in the drop zone menu 506). Navigating to additional drop zones using the navigation arrows 518 can also cause the drop zones shown in the menu screen 406 to adjust such that the user can see the drop zones in the menu screen 406 corresponding to the drop zone positions in the drop zone menu 506.

Figure 6:
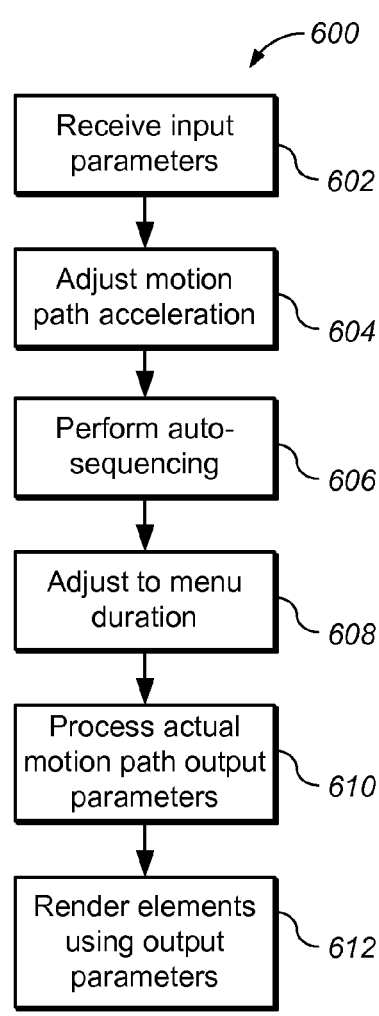
FIG. 6 shows a process for calculating a motion path for elements in a menu screen.

FIG. 6 shows a process 600 for determining the motion path to apply to an element or a group of elements. The steps of process 600 do not have to occur in any specific order, and at least some steps can occur in parallel in a multithreading or multiprocessing environment.

A number of input parameters are received (step 602). For example, the input parameters can be received from a menu controller (e.g., menu controller 202). The received parameters can include parameters from the theme definition as well as parameters associated with the selected media content to be included in the menu screen. Examples of input parameters include the menu screen duration as well as the duration of different menu screen portions. A typical menu cycle can include different phases, each having a particular duration. For example, a menu cycle can include an introduction phase, a main phase, and an outro phase. The menu screen duration can be defined as the sum of the durations of each phase in the menu cycle. The input parameters can also include parameters of the menu screen elements such as the position, size and type of the elements.

The input parameters can be used to adjust a base motion path defined for elements in the menu screen template. For example, the base motion path can define the movement of individual elements in a menu screen prior to the addition of any user media content (e.g., an empty drop zone). The base motion path defines the starting position, acceleration, or other behavior of the menu elements associated with the motion path. The adjustments to the motion path can be used to determine the actual motion path for a menu screen in light of the media content added to the menu screen template.

The motion path acceleration can be adjusted (step 604). The motion of one or more elements in the menu screen can be sped up or slowed down in order to create fluid menu screen animation. For example, the speed of an "ease-in" or "ease-out" of menu buttons during the introduction or outro time periods can be adjusted according to the duration of the introduction and outro menu phases.

Auto sequencing can also be applied to a group of elements (step 606). Elements of a same type or behavior can be grouped together in a single motion path instead of requiring separate motion paths to be calculated and executed independently for each element. For example, if a menu screen has a set of four drop zones that have the same rotational motion path around an axis, the motion path component can group the drop zone elements together into a single motion path. In another example, the menu screen can include a series of menu buttons which sequentially fade into the menu screen. The sequential fade-in of similar elements can be performed by a single motion path instead of a separate motion path for each button. Additionally, in one implementation, elements that have been grouped together can be accelerated as a whole. For example, if the sequence of a menu button fade-in would take longer then the introduction duration, the fade-in sequence can be adjusted for the entire group of menu elements to fit within the duration of the introduction phase.

The motion path can be adjusted to correspond to menu duration (step 608). The motion path component can calculate different time values for the menu depending on the input parameters providing the durations of the menu introduction, main (or looping), and outro phases. For example, a relative time can be calculated, which slows down or accelerates the motion path of one or more elements to fit the menu screen duration. A looping time can also be calculated. The looping time allows the motion path of elements during the main phase to continuously loop during the duration of the main phase. Finally, an adjusted looping time can also be calculated. The adjusted looping time is similar to the looping time in that the motion path loops during the main menu phase, however, the speed of the motion path is adjusted such that an integral number of loops occur during the main menu phase. Consequently, by determining the different menu timing, the motion path behavior can be adjusted to fit the required timing. In an alternative implementation, the menu duration itself can be adjusted to match the motion path.

In some implementations, motion path adjustments can take the specific media content of the menu screen into consideration. The motion path adjustments can occur individually or in combination depending on the input parameters. For example, if a user selects a particular music to play in the menu background while the menu is presented, the menu duration can be adjusted to last the length of the music. The motion path of various elements can also be adjusted according to the modified menu duration. For example, the number of loops of a drop zone motion path can be increased to match an increased menu duration.

The speed of the motion path for elements can be adjusted according to the particular media content associated with the elements. For example, a drop zone in a menu screen can include a movie clip. The drop zone can follow a defined motion path that translates off the menu screen, or rotates to become obscured by one or more other elements such as other drop zones. Using the length of the movie clip, the motion path of the drop zone can be adjusted such that the movie clip remains visible during the duration of the movie clip. Furthermore, if the drop zone with a movie clip is part of a group of drop zone elements, the motion path can be adjusted as a group (as discussed above) such that each drop zone's content is presented for the necessary amount of time depending on the drop zone's individual content. In another example, the motion path of an element can be adjusted to the menu screen duration such that the position of the element at the end of a menu loop is the same as the position of the menu element at the beginning of a loop, thus preventing discontinuity between main menu loops.

The actual motion path can be processed in light of any adjustments (step 610). The processing of the actual motion path takes the base motion path with any adjustments in order to calculate output parameters for each menu element. In one implementation, the motion path controller includes one or more kernel objects that perform the motion calculation to produce output parameters defining the actual motion path for a rendering. For example, the kernel object can receive the adjusted motion path parameters and execute an algorithm to produce the output parameters for rendering the menu element. Examples of kernel objects include a linear keyframe interpolator for calculating a parameter (e.g., for calculating opacity), a Bezier keyframe interpolator for calculating curved motion paths, and a javascript kernel, including code, to control behavior of a group of elements (e.g., flashing buttons in sequence).

The output parameters can be provided to the rendering component for rendering the menu screen elements (612). The output parameters can include the position, in three dimensions, of an element including an incremental offset from an initial reference position. Additionally, scaling factors for adjusting element size according to the calculated position in the three-dimensional environment (e.g., element becomes smaller when appearing to move back in the distance) can be provided. Other output parameters include a drawing order for overlapping elements, opacity, color, centers of rotation, and other movements. The output parameters can also include timing information. For example, an element's content, such as a movie clip in a drop zone, can be controlled by the timing parameters so that the content is not displayed until the element is visible on the menu screen (e.g., a movie clip in a drop zone is not played until the drop zone is visible). Additionally, timing information can be used such that a menu can begin at a point other than the beginning of the motion path or can run in reverse, fast-forward, or some other speed.

Other element effects rendered according to the motion path can include specific output parameters for controlling element behavior specifically designed to provide a particular effect. For example, the output parameters can provide element functionality that was designed outside of the menu generator (e.g., that was not part of the theme definition, but was independently added by the user). For example, a designer can define a button element to include a blur effect. The designer can define a motion path that provides an output parameter defining the blur effect applied to a button. The creation of element effects, independent of the menu controller, can be performed using a graphics development tool, such as Quartz Composer, which is described at http://developer.apple.com/documentation/GraphicsImaging/Conceptual-QuartzComposer/qc_intro/chapter_1_section_1.html the subject matter of which is hereby incorporated by reference.

Figure 7:
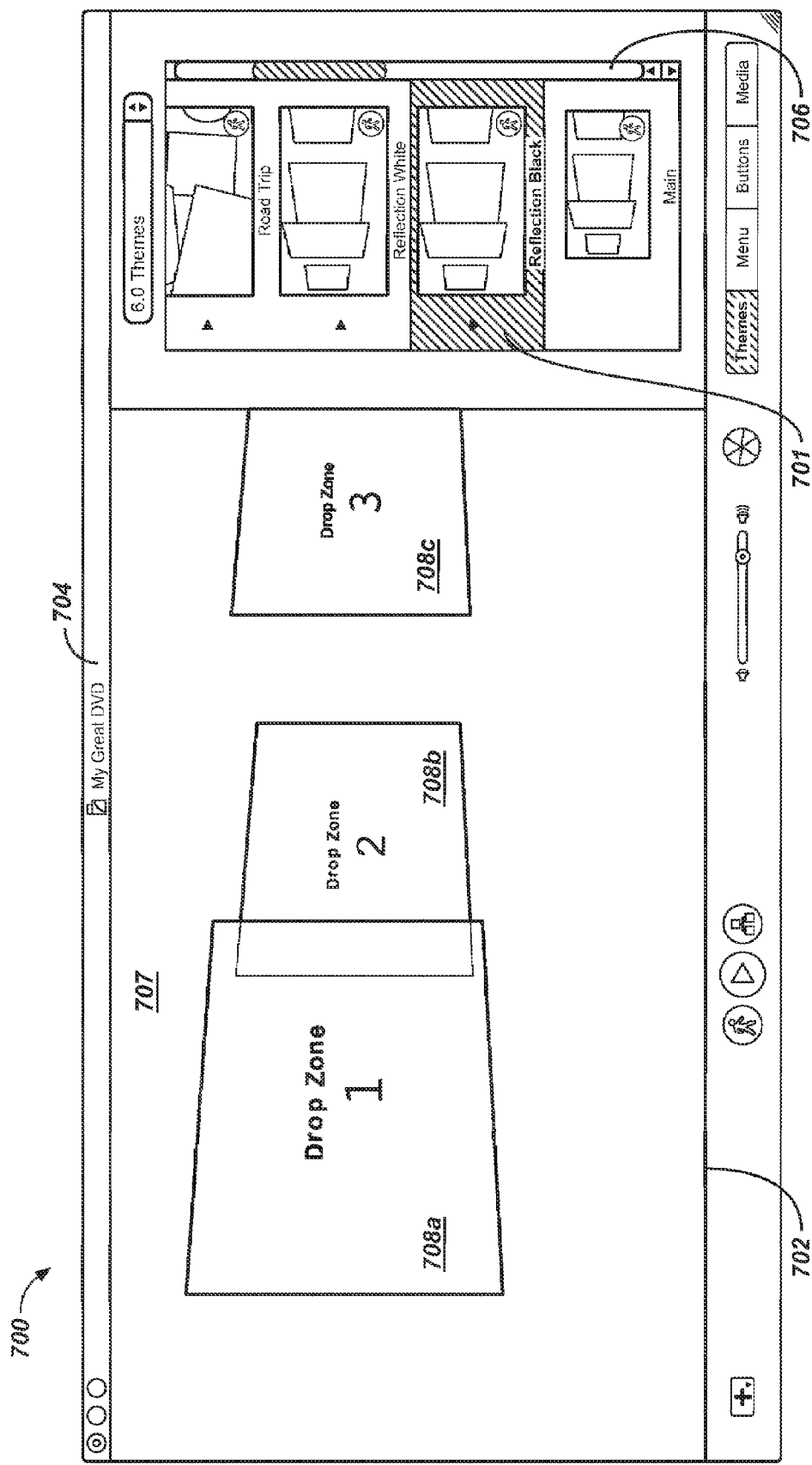
FIGS. 7-11 show screenshots of a menu screen including motion paths.

FIGS. 7-13 illustrate menu screens where a motion path is applied to elements of the menu. FIG. 7 shows a first screenshot 700 illustrating a menu screen 702 including a motion path during an introduction period. In some implementations, the menu screen 702 can be included in a media authoring interface 704. The media authoring interface 704 can be used to build and preview generated menu screens. The media authoring interface 704 can also include a content pane allowing the user to build the menu screen as discussed above with respect to FIG. 3. The menu screen 702 can be displayed by a device playing the finished project (e.g., a DVD player). The menu screen 702 shown in FIG. 7 represents a point in time when the menu screen is initially presented (e.g., the start of the introduction period).

The menu screen 702 includes drop zones 708*a*, 708*b*, and 708*c* arranged in a three-dimensional display environment 707. The particular display environment 707 presented by the menu screen 702 depends on the selected theme. As shown in screenshot 700, a reflection theme 701 has been selected for the menu screen where each drop zone is reflected in reflective surface supporting the drop zones. Drop zone 708*a* is presented in the foreground partially overlapping drop zone 708*b*. Drop zone 708*c* lies in a same plane as drop zone 708*a*, which is angled so that drop zone 708*c* appears further away from the front of the menu screen 702. In this example menu, there are no menu buttons or title present in the menu screen 702 presented at the start of the introduction period shown in FIG. 7. Each drop zone can include particular content as discussed above.

Figure 8:
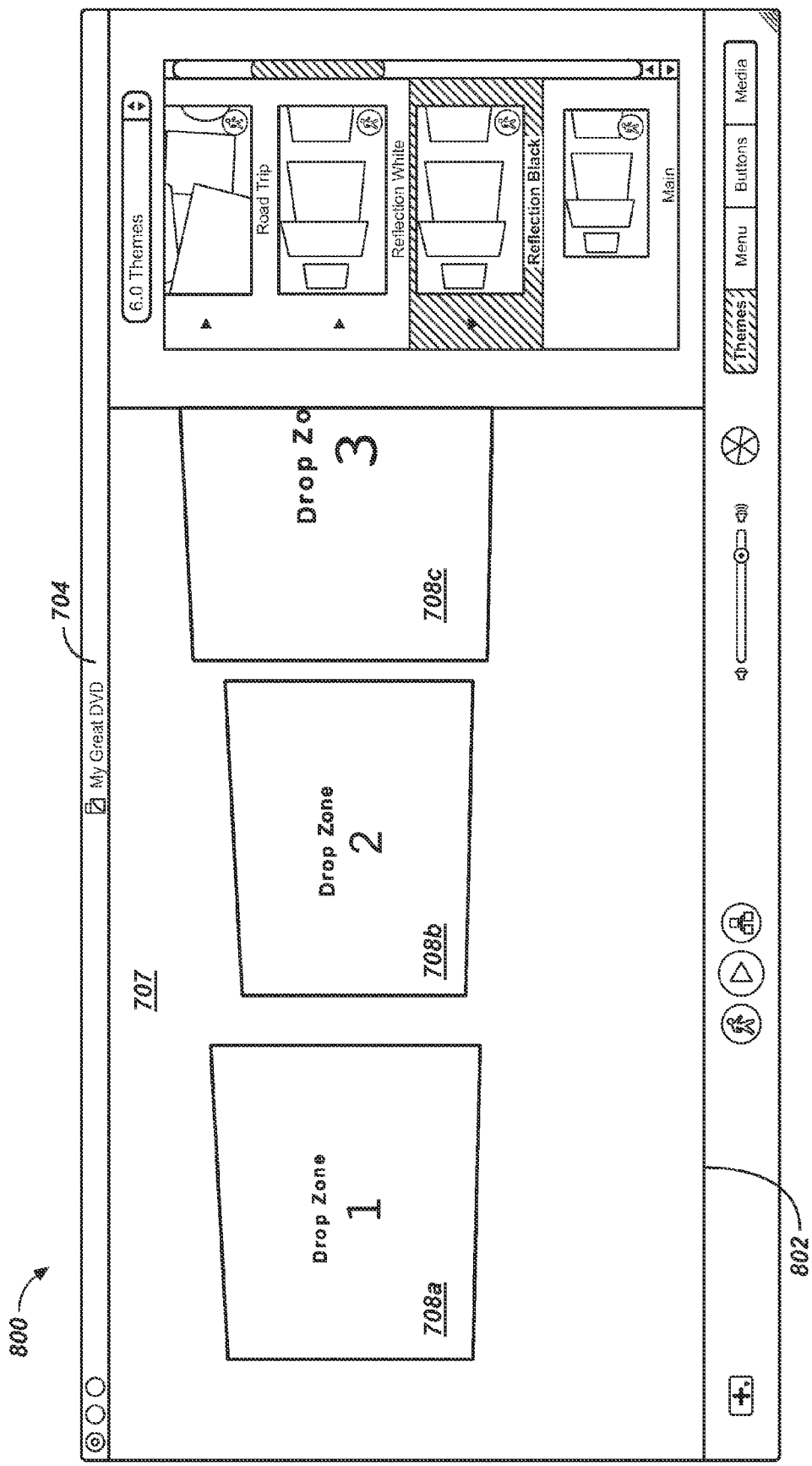

FIG. 8 shows a screenshot 800 of the media authoring interface 704. Media authoring interface 704 includes menu screen 802 showing a state of the menu screen after a time period t has passed from the menu screen 702. The menu screen 802 still displays drop zones 708*a*, 708*b*, and 708*c* within the environment 707. However, the position of drop zones 708*a*, 708*b*, and 708*c* has changed in accordance with the motion path.

Specifically, the drop zones 708*a*, 708*b*, 708*c* have rotated as a group around a vertical axis in the display environment 707 according to the motion path defined for the drop zones in the theme definition. The position of drop zone 708*c* now appears to be closer to the front of the menu screen 702 than drop zone 708*a*. The relative position between the drop zones 708*a*, 708*b*, and 708*c* has remained the same, just rotated. For example, the motion path can define a particular rotation over time for the group of drop zones. The time can be the entire menu duration or can be a smaller component such as the introduction portion of the menu screen 702.

Figure 9:
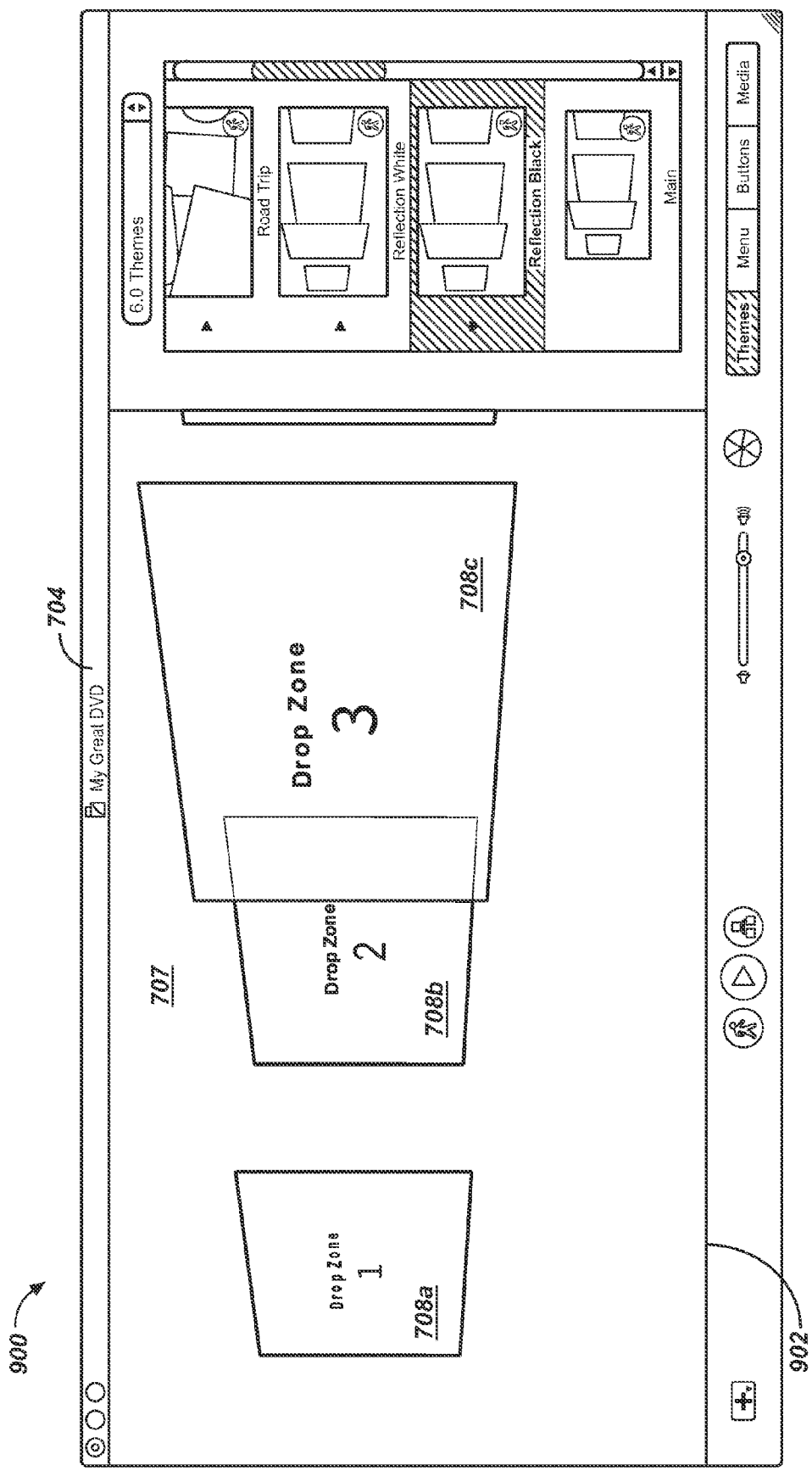

FIG. 9 shows a screenshot 900 of the media authoring interface 704. Media authoring interface 704 includes menu screen 902 showing a state of the menu screen after some additional time period has passed from the menu screen 802 shown in FIG. 8.

The menu screen 902 still displays drop zones 708*a*, 708*b*, and 708*c* within the environment 707. The continued rotation of the drop zones 708*a*, 708*b*, and 708*c* has caused drop zone 708*a* to appear to have receded into the distance of the environment 707 while drop zone 708*c* now is in the forefront and partially obscuring drop zone 708*b*. In addition to continued rotation of the drop zones 708*a*, 708*b*, and 708*c*, there is a translational movement of the group to the left of the menu screen 902. Thus, drop zone 708*c* is now fully visible within the menu screen 902.

Figure 10:
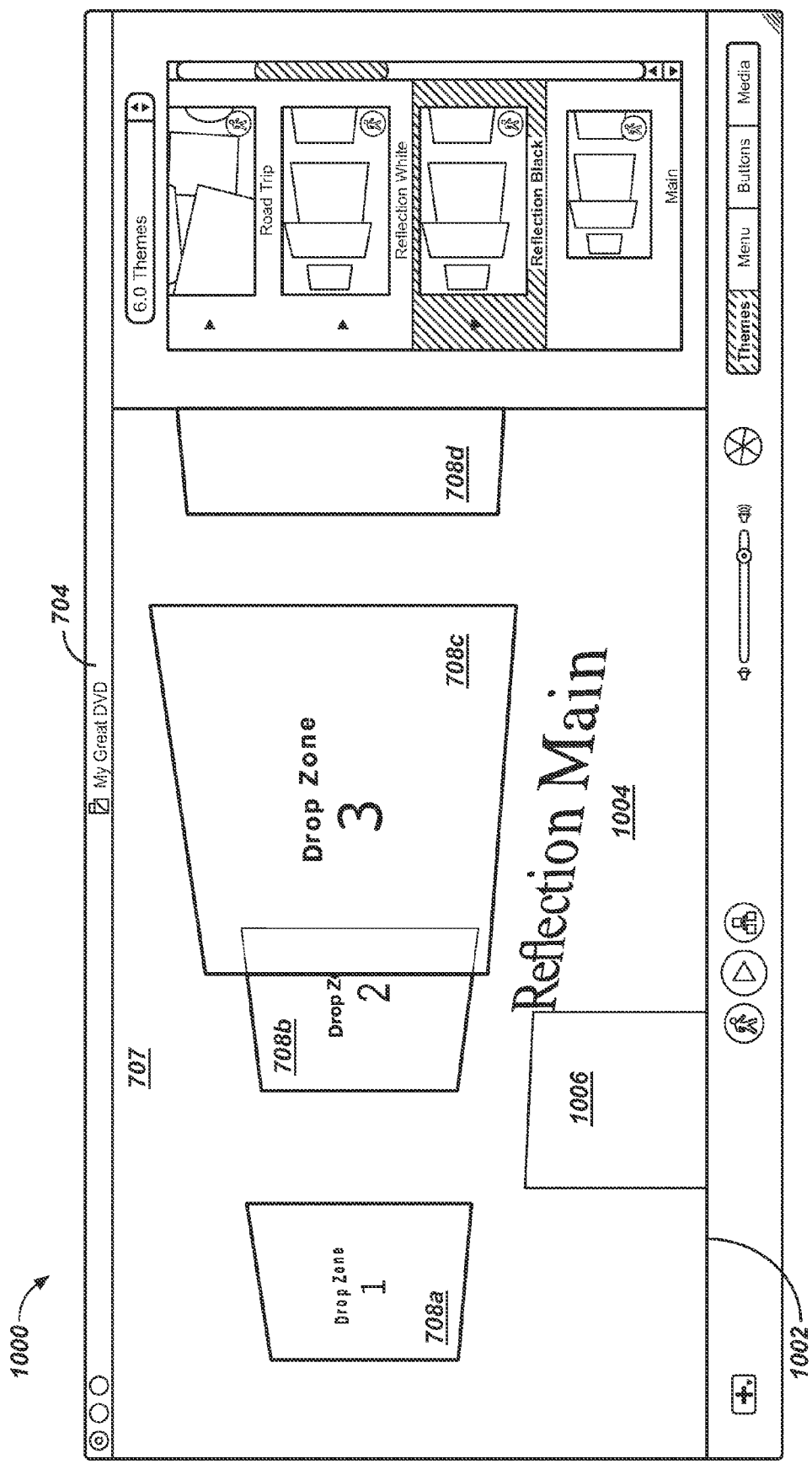

FIG. 10 shows a screenshot 1000 of the media authoring interface 704. Media authoring interface 704 includes menu screen 1002 showing a state of the menu screen after some additional time has passed from the menu screen 902 shown in FIG. 9. Drop zones 708*a*, 708*b*, and 708*c* are still present in the environment 707. Additionally, because of the continued translational motion of the group of drop zones, a new drop zone 708*d* is partially shown as entering from the right side of the menu screen 1002 while drop zone 708*a* appears to have moved further away.

In this Figure, the rotation of the drop zones has slowed. For example, the motion path can define a rotation as a function of time that slows down with time. In another implementation, the rotation can be defined over the introduction period of the menu duration and have a rotation that decreases as the end of the introduction period approaches. Alternatively, the rotation can be defined over an angular range and the motion path can define the rotation rate such that the rotation slows as the end of the defined angular range nears. Other rotational definitions are possible, for example, according to a mathematical formula or a program (e.g., JavaScript).

Additionally, new menu elements are entering the menu screen 1002; A title 1004 has appeared in the lower portion of the menu screen 1002. The title 1004 is only partially visible, for example, transitioning from fully transparent to visible (e.g., along a range of opacity values). Additionally, a glass pane 1006 effect is beginning to rise out of the bottom portion of the menu screen 1002. The glass pane 1006 is a partially transparent region that will include menu buttons.

Figure 11:
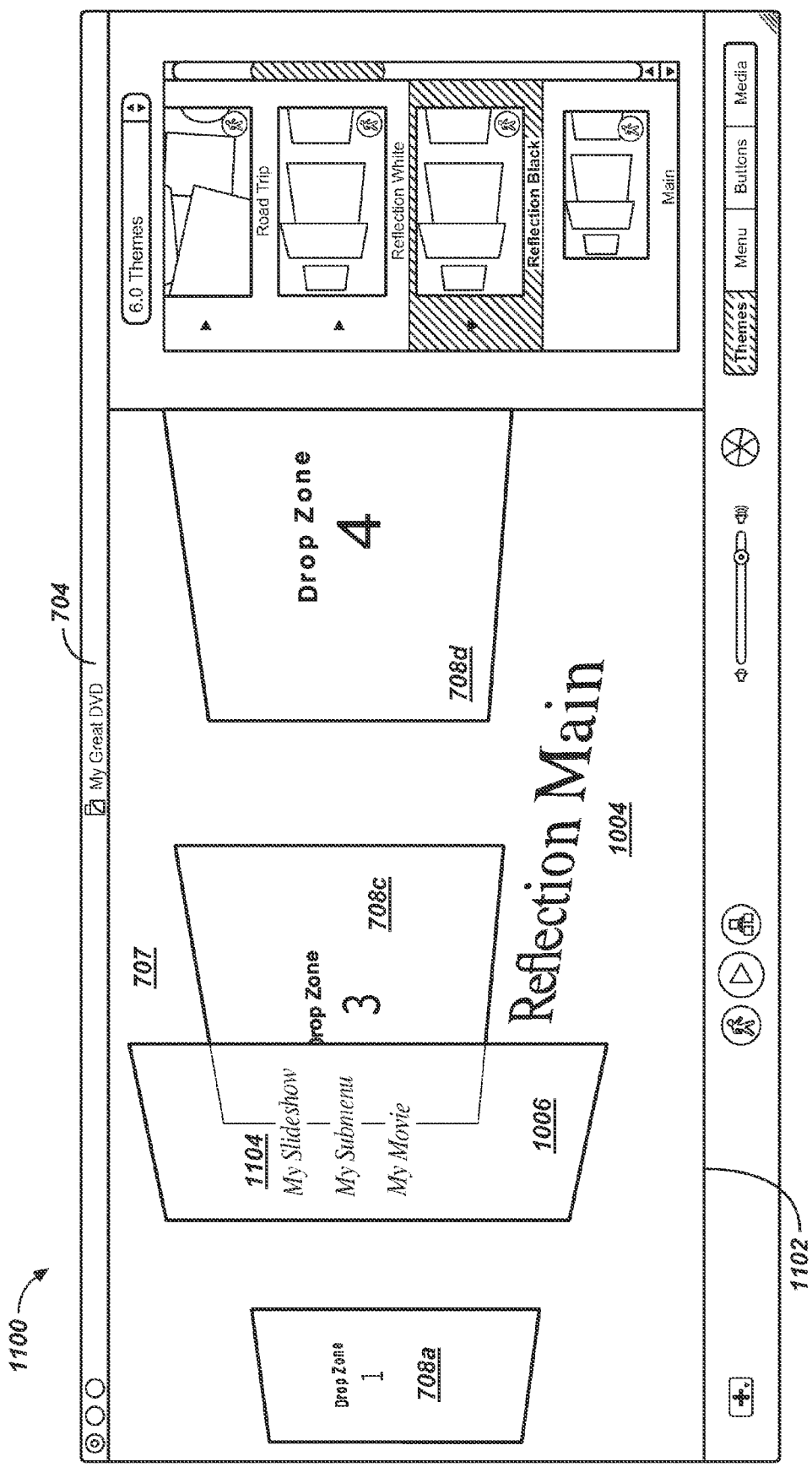

FIG. 11 shows a screenshot 1100 of the media authoring interface 704 including menu screen 1102 after some additional time period has passed from the menu screen 1002 of FIG. 10. The drop zones in the environment 707 continue to translate from right to left such that drop zone 708*d* is almost fully visible while drop zone 708*a* is fading away in the distance (e.g., decreasing in size, becoming dimmer).

Additionally, the rotation of the group of drop zones has stopped. In one implementation, the motion path for the drop zones can be defined to end once a particular degree of rotation has been reached. For example, the rotation can be defined as over a particular range such as from −25 degrees to 65 degrees, stopping once rotation has reached 65 degrees from the plane of the menu screen (e.g., menu screen 1102). In an alternative implementation, the rotation can be defined by a time period not a particular angle. For example, the motion path can define a rotational rate during the introductory period of the menu screen only. Consequently, the rotation ends once the menu introductory period ends.

The title 1004 has transitioned from a dim lettering to increased brightness making the title characters fully visible. The glass pane 1006 has fully risen in the foreground. The glass pane 1006 is partially transparent, and further includes a blur effect which blurs the drop zones (e.g., drop zone 708c) lying behind the glass pane 1006. Additionally, the menu buttons 1104 have become visible on the glass pane 1006. The menu buttons 1104 allow the user to interact with the menu screen 1102 in order to access particular content. In this particular example, the intro period of the menu screen is completed with menu screen 1102.

Figure 12:
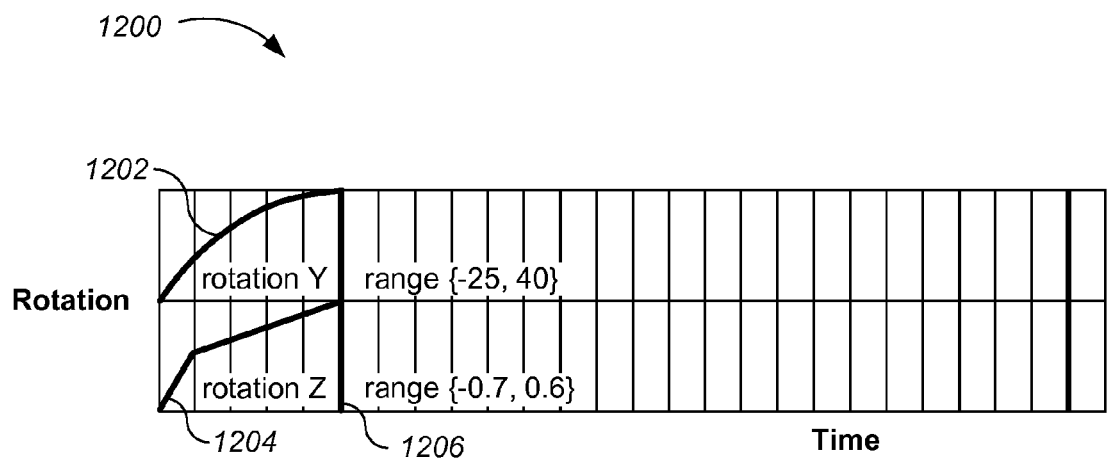
FIG. 12 illustrates a graph showing a motion path of a drop zone.
Figure 13:
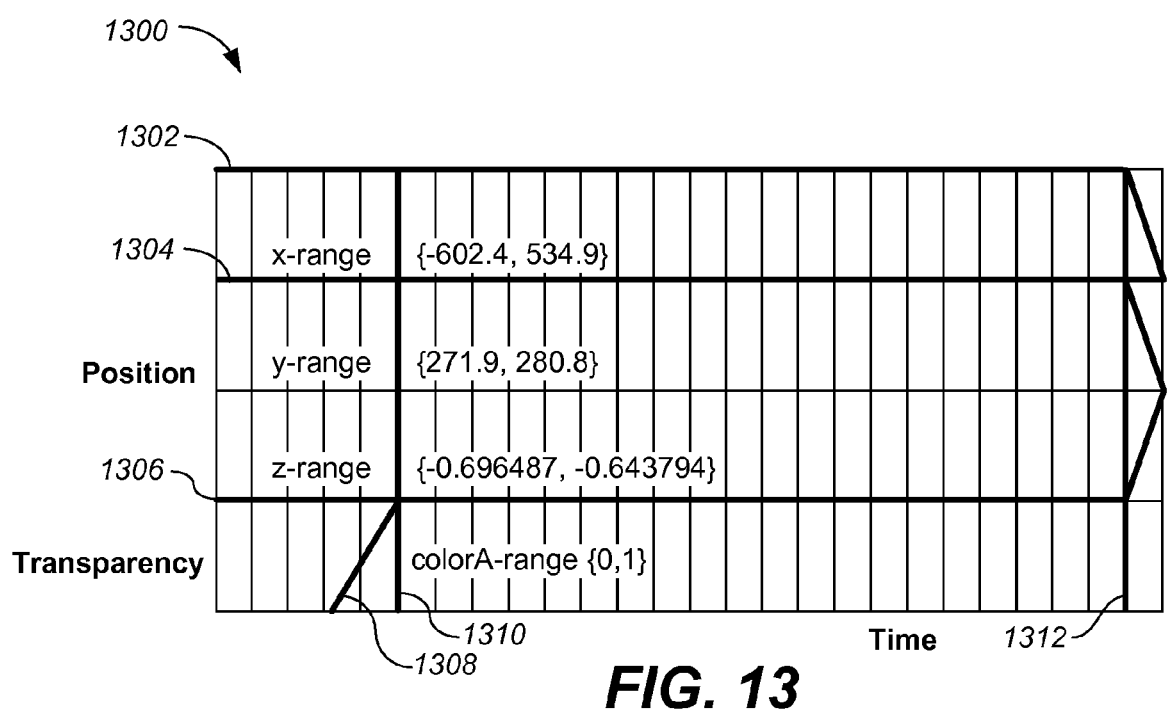
FIG. 13 illustrates a graph showing a motion path of a title element.

FIGS. 12-13 illustrate graphs of the motion path variables during the introduction period associated with the drop zones and the title, respectively, as a function of time. FIG. 12 shows a graph 1200 representing the rotation of the drop zones with respect to time. Plot 1202 shows the rotation, in degrees, in the y direction with time (e.g., according to the Bezier keyframe interpolator) while plot 1204 shows the rotation in the z direction (e.g., according to the linear keyframe interpolator). In this particular example, the rotation of the drop zones in the y direction ranges from −25 degrees to 40 degrees during the introduction period, which in FIG. 12 is five seconds ending at line 1206 (with a menu duration of 26 seconds). The rotation in the z direction follows a much smaller range from −0.7 degrees to 0.6 degrees. Other rotational ranges can be used.

FIG. 13 illustrates the motion path variables associated with the title (e.g., title 1004) on the menu screen. FIG. 13 shows a graph 1300 representing both the position and transparency of the title throughout the menu screen duration. Plot 1302 represents the x position of the title, plot 1304 represents the y position of the title, and plot 1306 represents the z position of the title. Plot 1308, in contrast, represents the transparency of the title. The introduction phase is distinguished from the main menu phase by dividing line 1310. As shown in FIG. 13, the position of the title remains constant throughout the introduction and main menu periods. As with FIG. 12, the introduction phase has a duration of five seconds out of the 26 second menu duration.

Figure 14:
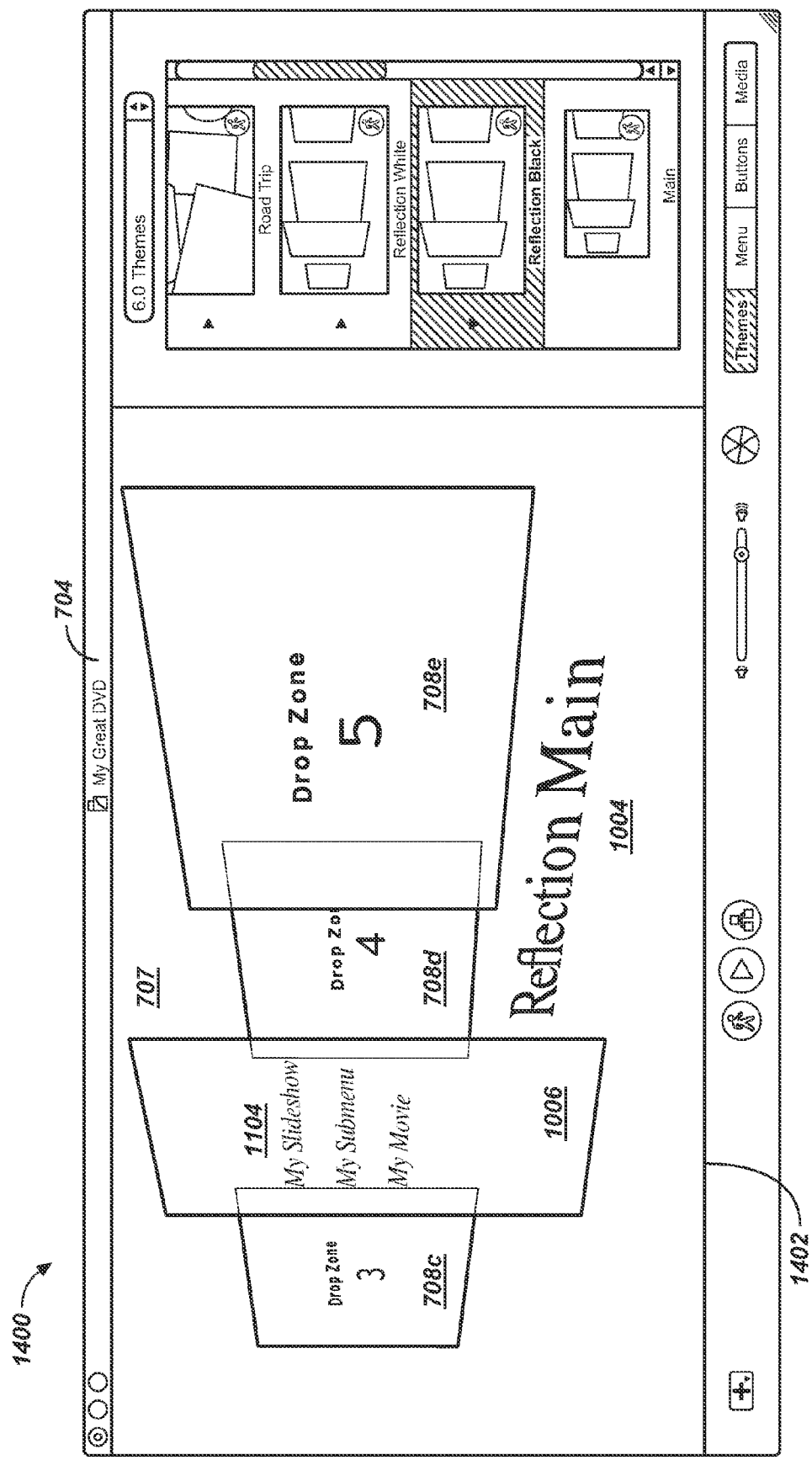
FIGS. 14-15 show screenshots of a menu screen including motion paths.

FIG. 14 shows a screenshot 1400 of the media authoring interface 704 including menu screen 1402 showing a state of the menu screen after some additional time period has passed from the menu screen 1102 of FIG. 11. In FIG. 14, the introduction period has ended, however the drop zones 708 continue to translate from right to left without additional rotation. A new drop zone, drop zone 708e, is visible while drop zones 708a and 708b have passed beyond the menu screen 1402. The title 1004 and the glass pane 1006 remain in the same position and transparency. Buttons 1104 in the glass pane 1006 have fully faded in and can be selected by the user in order to access other media content.

Figure 15:
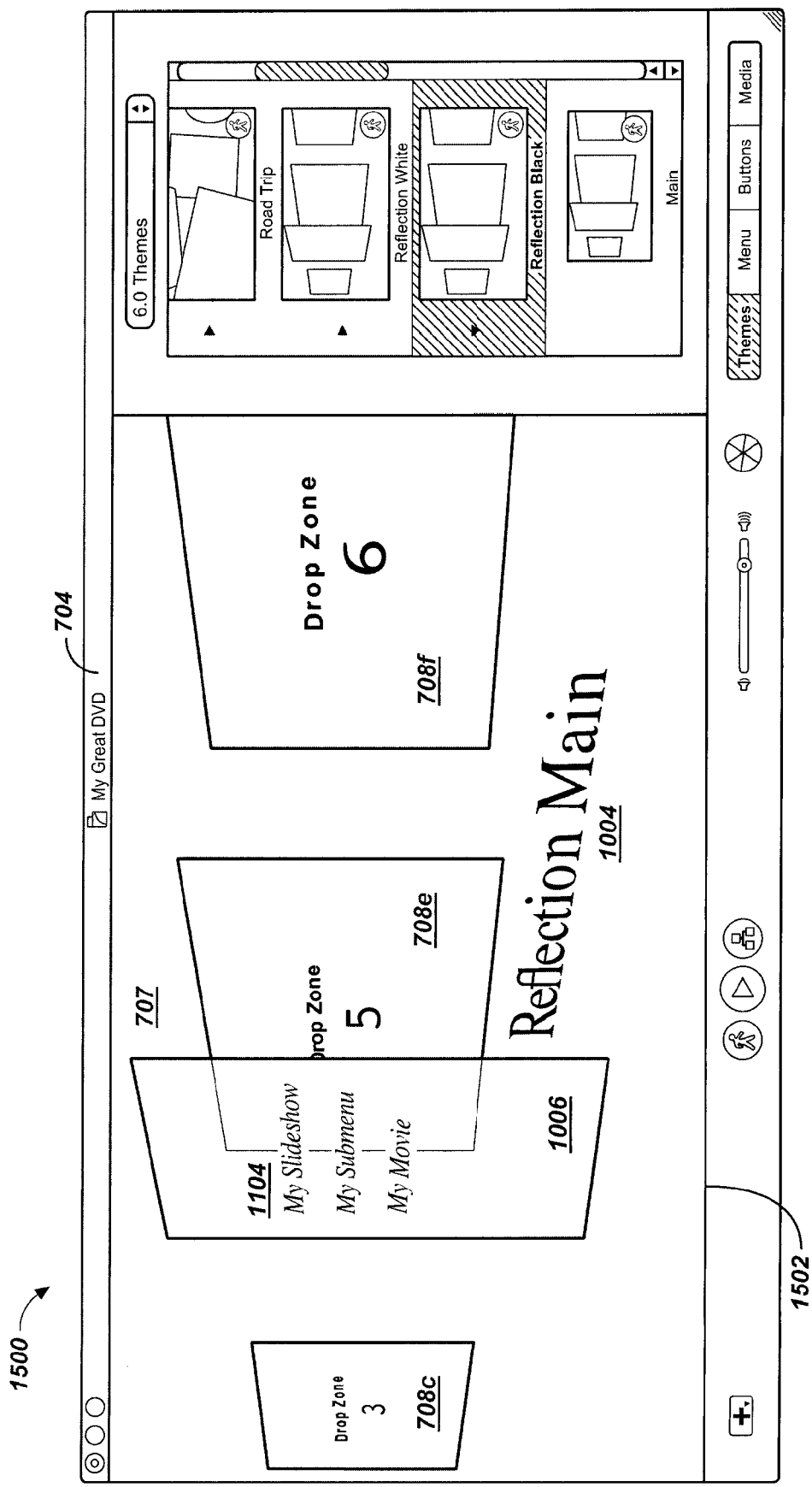

FIG. 15 shows a screenshot 1500 of the media authoring interface 704 including menu screen 1502 showing a state of the menu screen after some additional time period has passed from the menu screen 1402 of FIG. 14. In FIG. 15, the motion of the drop zones 708 continues. Drop zone 708c has nearly disappeared while yet another new drop zone 708f has entered the menu screen 1502. The motion of the drop zones continues to loop during the main menu period. Once the last drop zone has passed into the menu screen 1502, the first drop zone 708a can return to begin the cycle again. The looping of the drop zones in the menu screen 1502 can continue throughout the main period duration.

Following the main menu duration, different effects defined by motion paths can occur. For example, an outro portion can be provided to transition out of the main menu in order to loop the menu screen back to the introduction portion. For example, FIG. 13 illustrates the behavior of the title 1004 during an outro portion (as demarcated by dividing line 1312). The position components rapidly change along each axis in order to provide the effect of the title rapidly transitioning out of the menu screen. Other movements or fade out effects can be applied to other elements of the menu screen in order to return the menu screen to the introduction setting without an abrupt or discontinuous change in the menu screen appearance.

Figure 16:
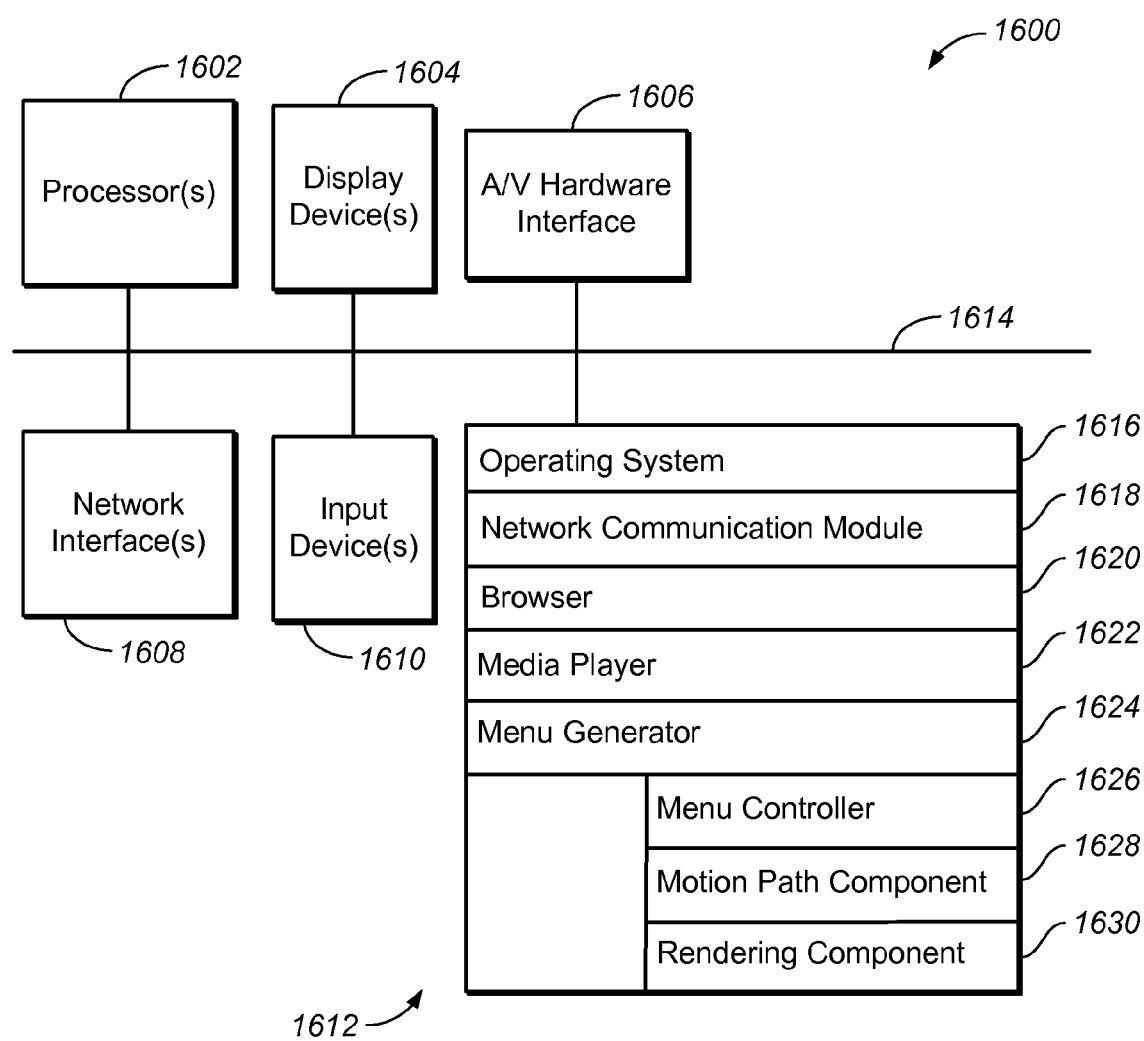
FIG. 16 shows a computer system for providing motion path elements.

FIG. 16 is a block diagram of an exemplary user system architecture 1600 capable of electronically receiving and managing access to digital media items. The architecture 1600 includes one or more processors 1602 (e.g., a CPU), one or more display devices 1604 (e.g., CRT, LCD), an audio/visual (A/V) interface 1606 (e.g., for connecting to a television receiver), a network interface 1608 (e.g., Ethernet connection, FireWire, USB, etc.), input devices 1610 (e.g., keyboard, mouse, etc.), and one or more computer-readable mediums 1612. These components exchange communications and data via one or more buses 1614 (e.g., EISA, PCI, PCI Express, etc.).

The term "computer-readable medium" refers to any medium that participates in providing instructions to a processor 1602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1612 further includes an operating system 1616 (e.g., Mac OS®, Windows®, Linux, etc.), a network communication module 1618, a browser 1620 (e.g., Safari®, Microsoft® Internet Explorer, Netscape®, etc.), a media player 1622 and a menu generator 1624.

The operating system 1616 can be multi-user, multiprocessing, multitasking, multithreading, real-time and the like. The operating system 1616 performs basic tasks, including but not limited to: recognizing input from input devices 1610; sending output to display devices 1604; keeping track of files and directories on computer-readable mediums 1612 (e.g., memory or a storage device); controlling peripheral devices (e.g., disk drives, printers, A/V interface 1606, etc.); and managing traffic on one or more buses 1614. The network communications module 1618 includes various components for establishing and maintaining network connections (e.g., software for implementing communication protocols, such as TCP/IP, HTTP, Ethernet, etc.). The browser 1620 enables the user to search a network (e.g., Internet) for information (e.g., digital media items). The media player 1622 (e.g., Quick Time®, Windows Media Player®, Real Player®, etc.) enables the user to view content.

The menu generator 1624 provides various software components for performing the various functions for menu generation and motion path calculation, as described with respect to FIGS. 2-15. The menu generator 1424 includes a menu controller 1626, motion path component 1628, and rendering component 1630. The menu generator 1626 includes software components for creating menus screens, as described with respect to FIG. 3. The motion path component 1628 includes software components for processing input parameters to calculate the actual motion path parameters, as describe with respect to FIG. 6. The rendering component 1630 includes software components for rendering graphical images in the menu screens using the output parameters provided by the motion path component 1628.

Particular embodiments of the invention have been described. Other embodiments are within the scope of the following claims. For example, the actions recited in the claims can be performed in a different order and still achieve desirable results. Additionally, other interpolators can be used to determine motion path parameters in addition to the linear and Bezier keyframes discussed above such as other spline interpolators. Motion paths can include or be defined according to different programming languages in addition to JavaScript (e.g., Java, LUA). Furthermore, motion path animations can be rendered in other applications in addition to menu generation, for example in other multimedia authoring application such as those for creating and editing video content.

What is claimed is:

1. A computer program product, encoded on a computer-readable hardware storage medium, operable to cause a data processing apparatus to perform operations comprising:
   generating a menu screen template, the menu screen template including one or more menu elements;
   calculating a base motion path associated with one or more menu elements;
   incorporating user selected media content in the menu screen template; and
   in response to incorporating the user selected media content, automatically adjusting the calculated base motion path according to one or more parameters of the user selected media content to calculate an adjusted motion path;
   wherein automatically adjusting the calculated base motion path according to one or more parameters comprises:
   determining a duration of the selected media content, the duration being a length of time defined by the media content; and
   automatically adjusting a speed of the calculated base motion path according to the duration of the selected media content to calculate the adjusted motion path.

2. The computer program product of claim 1, further comprising:
   generating a menu screen including rendering the menu elements according to the calculated motion path.

3. The computer program product of claim 1, where generating a menu screen template further comprises:
   receiving a user input selecting a theme for the menu screen template.

4. The computer program product of claim 1, where:
   the selected content is a movie clip;
   wherein automatically adjusting a speed of the calculated base motion path according to the duration of the selected media content comprises:
   automatically adjusting the speed of the calculated base motion path so that the calculated base motion path has a duration at least equal to the duration of the selected media content.

5. The computer program product of claim 1, where:
   the one or more menu elements comprises a plurality of drop zones, each drop zone having received corresponding user selected media content, and each user selected media content having a corresponding duration; and
   automatically adjusting a speed of the calculated base motion path according to the duration of the selected media content further comprises:
   generating a single motion path for a plurality of menu elements; and
   calculating a speed of the single motion path so that the selected media content for each drop zone is presented for at least the duration of the selected media content for the drop zone.

6. The computer program product of claim 1 where automatically adjusting a speed of the calculated base motion path according to one or more parameters further comprises:
   adjusting the calculated base motion path according to a duration of a generated menu screen.

7. A computer program product, encoded on a computer-readable hardware storage medium, operable to cause a data processing apparatus to perform operations comprising:
   generating a user interface for generating a menu screen including one or more adjusted motion paths, the user interface including:
   one or more content menus for selecting content for incorporation in a menu screen; and
   a menu screen window for providing a menu screen template having one or more motion paths, wherein the menu screen window is configured to receive user selected media content for incorporation in the menu screen template;
   calculating a base motion path associated with one or more menu elements;
   in response to incorporating the user selected media content, automatically adjusting the calculated base motion path according to one or more parameters of the user selected media content to calculate an adjusted motion path;
   wherein:
   each user selected media content has a corresponding duration being a corresponding length of time of defined by the selected media content; and
   automatically adjusting a speed of the calculated base motion path according to one or more parameters comprises automatically adjusting the calculated base motion path according to the durations of the user selected media content to calculate the adjusted motion path.

8. The computer program product of claim 7, the user interface further comprising:
   a theme selection menu, where selection of a theme provides one or more menu screen templates including a plurality of menu elements.

9. The computer program product of claim 8, where each menu screen template includes a theme definition that includes one or more animated menu elements defined by one or more motion paths.

10. The computer program product of claim 8, where the menu elements include a drop zone configured to receive user selected media content.

11. A computer-implemented method, comprising:
    generating a menu screen template, the menu screen template including one or more menu elements;
    calculating a base motion path associated with one or more menu elements;
    incorporating user selected media content in the menu screen template; and
    in response to incorporating the user selected media content, automatically adjusting the calculated base motion path according to one or more parameters of the selected media content to calculate an adjusted motion path;
    wherein automatically adjusting the calculated base motion path according to one or more parameters comprises:

determining a duration of the selected media content, the duration being a length of time defined by the media content; and automatically adjusting a speed of the calculated base motion path according to the duration of the selected media content to calculate the adjusted motion path.

12. A system comprising:

a processor;

a computer-readable hardware storage medium coupled to the processor and storing a computer program product, the processor operable to execute the computer program product to perform operations comprising:

generating a menu screen template, the menu screen template including one or more menu elements;

calculating a base motion path associated with one or more menu elements;

incorporating user selected media content in the menu screen template; and in response to incorporating the user selected media content, automatically adjusting the calculated base motion path according to one or more parameters of the user selected media content to calculate an adjusted motion path;

wherein automatically adjusting the calculated base motion path according to one or more parameters comprises:

determining a duration of the selected media content, the duration being a length of time defined by the media content; and automatically adjusting a speed of the calculated base motion path according to the duration of the selected media content to calculate the adjusted motion path.

13. The system of claim 12, where the processor is further operable further to execute the computer program product to perform operations comprising:

generating a menu screen including rendering the menu elements according to the calculated motion path.

14. The system of claim 12, where generating a menu screen template further comprises:

receiving a user input selecting a theme for the menu screen template.

15. The system of claim 12, where:

the selected content is a movie clip;

wherein automatically adjusting a speed of the calculated base motion path according to the duration of the selected media content comprises:

automatically adjusting the speed of the calculated base motion path so that the calculated base motion path has a duration at least equal to the duration of the selected media content.

16. A system comprising:

a processor;

a computer-readable hardware storage medium coupled to the processor and storing a computer program product, the processor operable to execute the computer program product to perform operations comprising:

generating a user interface for generating a menu screen including one or more adjusted motion paths, the user interface including:

one or more content menus for selecting content for incorporation in a menu screen; and a menu screen window for providing a menu screen template having one or more motion paths, wherein the menu screen window is configured to receive user selected media content for incorporation in the menu screen template;

calculating a base motion path associated with one or more menu elements; and in response to incorporating the user selected media content, automatically adjusting the calculated base motion path according to one or more parameters of the user selected media content to calculate an adjusted motion path;

wherein:

each user selected media content has a corresponding duration being a corresponding length of time of defined by the user selected media content; and automatically adjusting a speed of the calculated base motion path according to one or more parameters comprises automatically adjusting the calculated base motion path according to the durations of the user selected media content to calculate the adjusted motion path.

17. The system of claim 16, the user interface further comprising:

a theme selection menu, where selection of a theme provides one or more menu screen templates including a plurality of menu elements.

18. The system of claim 17, where each menu screen template includes a theme definition that includes one or more animated menu elements defined by one or more motion paths.

* * * * *